United States Patent
Chang et al.

(10) Patent No.: US 10,171,185 B2
(45) Date of Patent: Jan. 1, 2019

(54) DEVICE AND METHOD OF HANDLING SOFT INFORMATION

(71) Applicant: Realtek Semiconductor Corp., HsinChu (TW)

(72) Inventors: Chung-Yao Chang, Hsinchu County (TW); Yi-Syun Yang, New Taipei (TW); Kai-Jie Yang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 22 days.

(21) Appl. No.: 15/287,716

(22) Filed: Oct. 6, 2016

(65) Prior Publication Data
US 2017/0237508 A1    Aug. 17, 2017

(30) Foreign Application Priority Data
Feb. 15, 2016    (TW) .............................. 105104289 A

(51) Int. Cl.
| | |
|---|---|
| H04B 17/21 | (2015.01) |
| H04B 17/336 | (2015.01) |
| H04L 25/02 | (2006.01) |
| H04L 25/06 | (2006.01) |

(52) U.S. Cl.
CPC ........... *H04B 17/21* (2015.01); *H04B 17/336* (2015.01); *H04L 25/0256* (2013.01); *H04L 25/067* (2013.01)

(58) Field of Classification Search
CPC .. H04B 17/21; H04B 25/0256; H04B 17/336; H04L 2025/0349
See application file for complete search history.

(56) References Cited

U.S. PATENT DOCUMENTS

| | | | | |
|---|---|---|---|---|
| 6,442,130 | B1* | 8/2002 | Jones, IV | H04B 7/0845 370/208 |
| 6,973,296 | B2* | 12/2005 | Webster | H04L 25/03159 455/130 |
| 8,649,452 | B2* | 2/2014 | Horisaki | H04L 27/2689 375/260 |
| 2007/0002982 | A1* | 1/2007 | Heikkila | H04L 1/20 375/346 |

(Continued)

FOREIGN PATENT DOCUMENTS

| | | |
|---|---|---|
| CN | 1829208 A | 9/2006 |
| TW | 201503636 A | 1/2015 |

*Primary Examiner* — Freshteh N Aghdam
(74) *Attorney, Agent, or Firm* — Winston Hsu

(57) ABSTRACT

A receiving device comprises a signal detection unit, a reliability unit coupled to the signal detection unit and a decoding unit coupled to the signal detection unit and the reliability unit. The signal detection unit is for receiving a plurality of compensated symbols on a plurality of subcarriers, to generate a plurality of soft information and a plurality demodulated symbols of the plurality of compensated symbols according to the plurality of compensated symbols. The reliability unit is for generating a plurality of weights of the plurality of soft information according to a plurality of reliability information of the plurality of subcarriers. The decoding unit is for decoding the plurality of demodulated symbols according to the plurality of soft information and the plurality of weights, to generate a plurality of decoded bits.

16 Claims, 4 Drawing Sheets

(56) References Cited

U.S. PATENT DOCUMENTS

| | | | |
|---|---|---|---|
| 2008/0084940 A1* | 4/2008 | Hou | H04L 25/022 |
| | | | 375/260 |
| 2010/0095180 A1 | 4/2010 | Sawai | |
| 2013/0259164 A1 | 10/2013 | Hui | |
| 2016/0092301 A1* | 3/2016 | Ish-Shalom | G06F 11/1068 |
| | | | 714/764 |
| 2017/0163319 A1* | 6/2017 | Chavali | H04L 1/0054 |

* cited by examiner

DEVICE AND METHOD OF HANDLING SOFT INFORMATION

BACKGROUND OF THE INVENTION

1. Field of the Invention

The present invention relates to a device and a method used in a communication system, and more particularly, to a device and a method of handling soft information.

2. Description of the Prior Art

Orthogonal frequency-division multiplexing (OFDM) (or termed as discrete multi-tone modulation (DMT) technique) is adopted in various modern high-speed communications systems for transmitting and receiving signals due to its high bandwidth efficiency and robustness against fading, to increase a probability of recovering the signals correctly. Various numbers of bits can be allocated on subcarriers according to the OFDM, to use channel capacity efficiently.

In general, when a communication system using an OFDM is operated, part of subcarriers is used for channel estimation, such that a receiver can obtain channel responses (e.g., channel frequency responses) corresponding to all the subcarriers via the part of the subcarriers, to use the estimated channel responses for recovering transmitted symbols (e.g., data) on the subcarriers. In detail, a transmitter allocates reference signals known by the receiver on the part of the subcarriers. The reference signals are transmitted with data signals to the receiver, when the transmitter transmits an OFDM signal formed by all subcarriers. After receiving the OFDM signal, the receiver can use the reference signals to estimate the channel responses (abbreviated as the reference channel responses) corresponding to the subcarriers for transmitting the reference signals, and can also estimate the channel responses (abbreviated as the data channel responses) corresponding to the subcarriers for transmitting the data signals according to the reference channel responses. Thus, after estimating the data channel responses, the receiver can use the estimated channel responses for signal processing operations, such as equalization, demodulation, decoding, etc., to recover the data signals.

However, an allocation of the reference signals is usually not perfect or specific subcarriers are subject to greater interferences, so that accuracies of the data channel responses of different subcarriers are different. The accuracies of the data channel responses are even with considerable differences, e.g., the accuracies are particularly low, such that performances of the equalization, the demodulation and the decoding are affected. Thus, how to reduce the effect of the channel responses caused to the receiving performance is an important problem to be solved.

SUMMARY OF THE INVENTION

The present invention therefore provides a device and a method for handling soft information to solve the above-mentioned problem.

A receiving device comprises a signal detection unit, a reliability unit coupled to the signal detection unit and a decoding unit coupled to the signal detection unit and the reliability unit. The signal detection unit is used for receiving a plurality of compensated symbols on a plurality of subcarriers, to generate a plurality of soft information and a plurality demodulated symbols of the plurality of compensated symbols according to the plurality of compensated symbols. The reliability unit is used for generating a plurality of weights of the plurality of soft information according to a plurality of reliability information of the plurality of subcarriers. The decoding unit is used for decoding the plurality of demodulated symbols according to the plurality of soft information and the plurality of weights, to generate a plurality of decoded bits.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
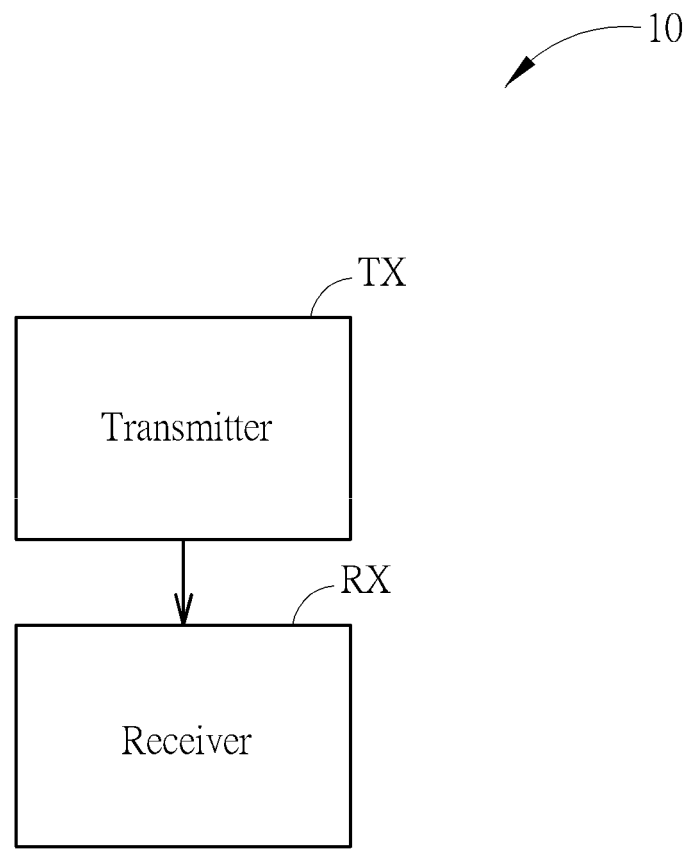
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are simply utilized for illustrating the structure of the communication system 10. For example, the communication system 10 may be asymmetric digital subscriber line (ADSL) system, a power line communication (PLC) system, an Ethernet over coax (EOC) and other wired communication systems, or may be a wireless local area network (WLAN), a Digital Video Broadcasting (DVB) system, a Long Term Evolution-advanced (LTE-A) system and other wireless communication systems, wherein the DVB system may include a DVB-Terrestrial (DVB-T) system and a DVB-T2 system. In addition, the transmitter TX and the receiver RX may be installed in a mobile phone, a laptop, a tablet computer, an electronic book, a portable computer system, etc.

Figure 2:
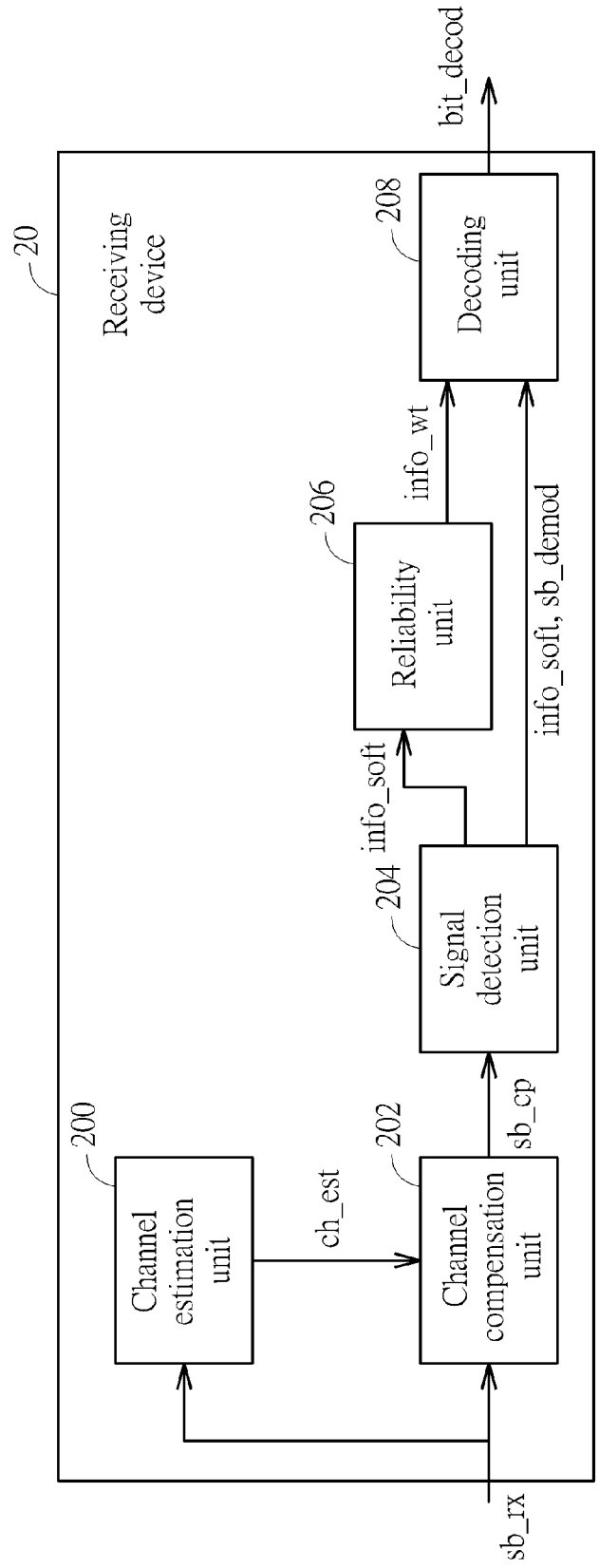
FIG. 2 is a schematic diagram of a receiving device according to an example of the present invention.

Please refer to FIG. 2, which is a schematic diagram of a receiving device 20 according to an example of the present invention. The receiving device 20 may be utilized in the receiver RX in FIG. 1 for compensating an estimated channel. The receiving device 20 includes a channel estimation unit 200, a channel compensation unit 202, a signal detection unit 204, a reliability unit 206 and a decoding unit 208. In detail, the channel estimation unit 200 may generate a plurality of estimated channel responses ch_est of a plurality of subcarriers according to a plurality of reference symbols in a plurality of received symbols sb_rx, after obtaining the plurality of received symbols sb_rx on the plurality of subcarriers. The received symbols may be generated via a quadrature phase-shift keying (QPSK) or other modulation schemes, but is not limited herein. The channel compensation unit 202 is coupled to the channel estimation unit 200 and the signal detection unit 204, for processing the plurality of received symbols sb_rx according to the plurality of estimated channel responses ch_est, to generate a plurality of compensated symbols sb_cp. That is, the channel compensation unit 200 may use the plurality of estimated channel responses ch_est for compensating (e.g., equalizing) an effect caused by a channel (e.g., fading).

The signal detection unit 204 is coupled to the channel compensation unit 202, for receiving the plurality of compensated symbols sb_cp, to generate a plurality of soft information info_soft and a plurality demodulated symbols sb_demod of the plurality of compensated symbols according to the plurality of compensated symbols sb_cp. That is, the signal detection unit 204 may demodulate the compensated symbols, and may generate the soft information corresponding to the symbols. The plurality of soft information may include a plurality of log likelihood ratios (LLRs), but is not limited herein. The reliability unit 206 is coupled to the signal detection unit 204, for generating a plurality of weights info_wt of the plurality of soft information info_soft according to a plurality of reliability information of the plurality of subcarriers. The decoding unit 208 is coupled to the signal detection unit 204 and the reliability unit 206, for decoding the plurality of demodulated symbols sb_demod according to the plurality of soft information info_soft and the plurality of weight info_wt, to generate a plurality of decoded bits bit_decod. The decoding unit 208 can operate according to various encoding/decoding rules, such as a convolutional code, a turbo code, a low-density parity-check (LDPC) code, etc.

In other words, the decoding unit 208 does not use the plurality of soft information info_soft for decoding the plurality of demodulated symbols sb_demod directly, but the plurality of soft information info_soft is weighted by the plurality of weight info_wt first according to the present invention, to compensate a reduction of decoding performance caused by an inaccuracy of channel estimation. The reason for the inaccuracy may be that the subcarriers corresponding to the channel responses are at a band edge, such that a number of reference symbols for an interpolation is not sufficient or only an extrapolation can be used, but is not limited herein. Thus, the present invention can improve the performance of the decoding unit 208, and can reduce an error rate of the plurality of decoded bits bit_decod.

Figure 3:
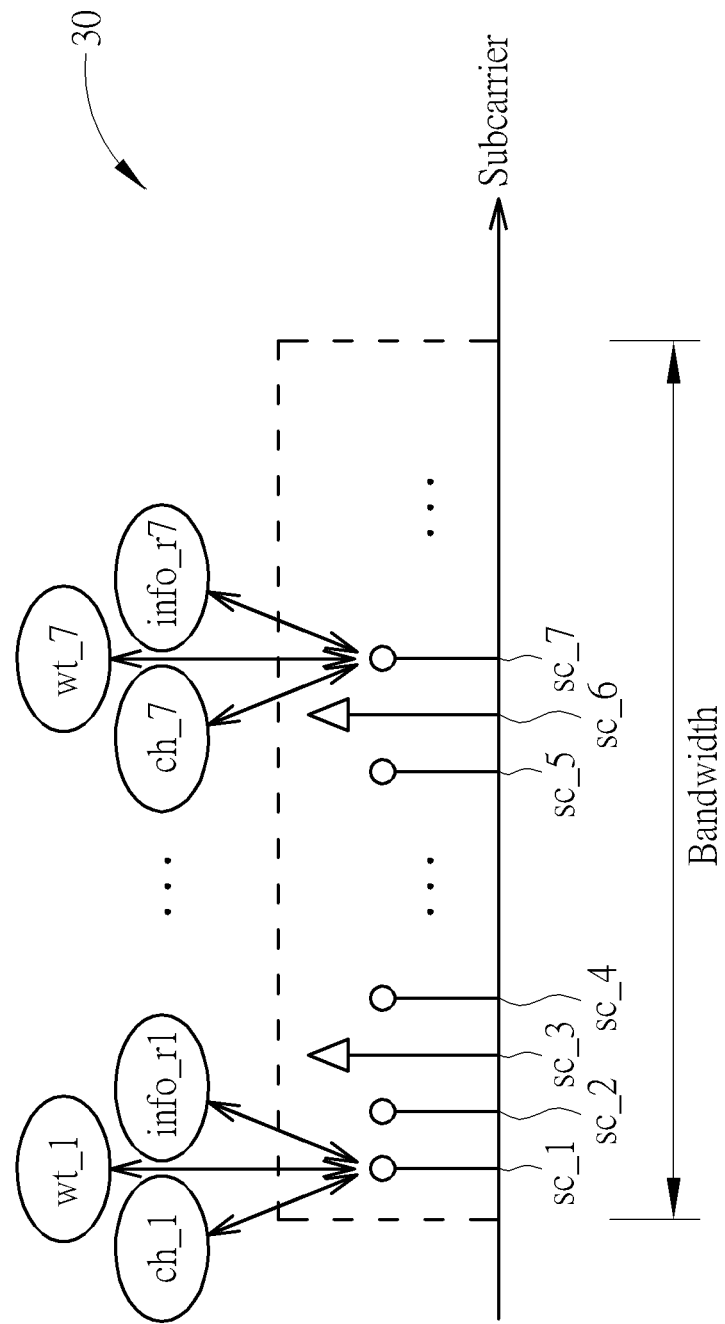
FIG. 3 is a schematic diagram of a subcarrier allocation according to an example of the present invention.

FIG. 3 is a schematic diagram of a subcarrier allocation 30 according to an example of the present invention. FIG. 3 may be combined with FIG. 2 to illustrate the following examples. For ease of illustration, only subcarriers sc_1-sc_7 in a bandwidth are shown in FIG. 3, and those skilled in the art can apply the present invention to other subcarriers which are not shown according to the following description. The subcarriers sc_1-sc_7 are corresponding to a plurality of estimated channel responses ch_1-ch_7, a plurality of reliability information info_r1-info_r2 and a plurality of weights wt_1-wt_7, respectively. In the present example, the subcarriers sc_1-sc_2, sc_4, sc_5 and sc_7 are used for transmitting data symbols (i.e., data signals), and the subcarriers sc_3 and sc_6 are used for transmitting reference symbols (i.e., reference signals). After receiving the reference symbols, the channel estimation unit 202 can obtain the estimated channel response ch_1 via an extrapolation operation or can obtain the estimated channel responses ch_2, ch4, ch_5 and ch_7 via interpolation operations in addition to generating the channel responses ch_3 and ch_6 according to the reference symbols, but is not limited herein.

There are various realizations of the reliability unit 206, and the reliability information may be generated according to different methods. Then, the plurality of weights info_wt can be generated according to the reliability information.

In one example, the plurality of reliability information may include a plurality of signal energies of the plurality of subcarriers. That is, the reliability unit 206 may generate the plurality of weights info_wt according to the plurality of signal energies, after measuring (or calculating) the plurality of signal energies of the plurality of subcarriers. For example, a weight of a first subcarrier (e.g., subcarrier sc_4) of the plurality of subcarriers is smaller than or equal to a weight of a second subcarrier (e.g., subcarrier sc_3) of the plurality of subcarriers, if a signal energy of the first subcarrier is smaller than a signal energy of the second subcarrier according to the plurality of signal energies. That is, soft information of a subcarrier with a higher signal energy may be set to have a higher weight.

In one example, the plurality of reliability information may include a plurality of signal-to-noise ratios (SNRs) of the plurality of subcarriers. That is, the reliability unit 206 may generate the plurality of weights info_wt according to the plurality of SNRs, after measuring (or calculating) the plurality of SNRs of the plurality of subcarriers. For example, a weight of a first subcarrier (e.g., subcarrier sc_4) of the plurality of subcarriers is smaller than or equal to a weight of a second subcarrier (e.g., subcarrier sc_3) of the plurality of subcarriers, if an SNR of the first subcarrier is smaller than an SNR of the second subcarrier according to the plurality of SNRs. That is, soft information of a subcarrier with a higher SNR may be set to have a higher weight.

In one example, the plurality of reliability information may include a plurality of location information of the plurality of subcarriers. That is, the reliability unit 206 may generate the plurality of weights info_wt according to the plurality of location information, after receiving the plurality of location information of the plurality of subcarriers.

For example, a weight of a first subcarrier (e.g., subcarrier sc_1) of the plurality of subcarriers is smaller than or equal to a weight of a second subcarrier (e.g., subcarrier sc_2) of the plurality of subcarriers, if a distance between the first subcarrier and a band edge of the plurality of subcarriers is smaller than a distance between the second subcarrier and the band edge according to the plurality of location information. That is, soft information of a subcarrier closer to a band edge may be set to have a lower weight. The reason for the setting may be that only an interpolation with a lower order or an extrapolation with a lower accuracy may be used for the subcarrier closer to the band edge, to obtain a channel response of the subcarrier. In this situation, an accuracy of the channel response of the subcarrier closer to the band edge is usually lower. Thus, the subcarrier should be set to have the lower weight to reduce a proportion of the soft information.

For example, a weight of a first subcarrier (e.g., subcarrier sc_1) of the plurality of subcarriers is smaller than or equal to a weight of a third subcarrier (e.g., subcarrier sc_4) of the plurality of subcarriers, if a distance between the first subcarrier and a second subcarrier (e.g., subcarrier sc_2) with an interference of the plurality of subcarriers is smaller than a distance between the third subcarrier and the second subcarrier according to the plurality of location information. That is, soft information of a subcarrier closer to an interference may be set to have a lower weight. There are various types of interferences, such as a cross-subcarrier interference, a color noise, a spur noise, etc., but is not limited herein. There are also various methods for determining whether there is an interference on a subcarrier, such as determining whether the interference is existed according to whether a magnitude of the interference (e.g., energy of the interference) is greater than a predetermined value, assuming an existence of the interference according to a previous measurement result of the subcarrier, etc., but is not limited herein.

In one example, the plurality of reliability information may include a plurality of filter response parameters corresponding to the plurality of subcarriers. Preferably, soft information of a subcarrier with a higher filter response parameter may be set to have a higher weight. That is, a weight of a subcarrier corresponding to a first filter response parameter of the plurality of filter response parameters is smaller than or equal to a weight of a subcarrier corresponding to a second filter response parameter of the plurality of filter response parameters, if the first filter response parameter is smaller than the second filter response parameter according to the plurality of filter response parameters. In one example, the plurality of soft information may be divided into a plurality sets of soft information corresponding to the plurality of weights, respectively. That is, weight(s) of a set of soft information (i.e., a set of subcarriers) may be the same.

In one example, the plurality of reliability information may include a plurality of mean square errors (MSEs) of the plurality of the estimated channel responses. That is, the reliability unit 206 may generate the plurality of weights info_wt according to the plurality of MSEs, after measuring (or calculating) the plurality of MSEs of the plurality of estimated channel responses. For example, a weight of a subcarrier corresponding to a first channel response of the plurality of channel responses is greater than a weight of a subcarrier corresponding to a second channel response of the plurality of channel responses, if a MSE of the first channel response is smaller than or equal to a MSE of the second channel response according to the plurality of MSEs. That is, soft information of a subcarrier corresponding to a channel response with a higher MSE may be set to have a lower weight.

How to calculate weights of soft information according to MSEs is further illustrated in the following example. A set of subcarriers $\Omega$ is first defined according to available information, such as locations of subcarriers, interferences, color noises, spur noises, etc. The subcarriers in the set satisfy one or more of the following conditions: (1) channel responses of the subcarriers may be obtained by performing interpolations or extrapolations according to reference symbols; (2) not subject to (or only slightly subject to) specific frequency-domain interferences, such as narrowband interferences, color noises, spur noises, etc. According to the set, a reference value of the MSE may be obtained as follows:

$$MSE_{avg}(SNR) = \Sigma_{i \in \Omega} MSE(SNR,i)/|\Omega|, \quad (Eq. 1)$$

where i is a subcarriers index. Then, MSE(SNR, i) and $MSE_{avg}(SNR)$ are used for calculating a ratio of an average MSE (with respect to an average of SNRs) of a subcarrier as follows:

$$\rho_i = \int_{SNR} [MSE(SNR,i)/MSE_{avg}(SNR)], \quad (Eq. 2)$$

and an average value of ρi is obtained as follows:

$$\rho_{avg} = \Sigma_{i \in \Omega} \rho_i/|\Omega|. \quad (Eq. 3)$$

Then, (N+1) thresholds are set as follows, and can be expressed as $\{T(0), \ldots, T(N)\}$, where $T(0) < T(1) < \ldots < T(N)$:

$$T(n) = 2^{n+1} \rho_{avg}, 0 \leq 1 \leq N-1, T(N) = \infty, \quad (Eq. 4)$$

where subcarriers with average MSEs in these intervals can be divided into N sets, $\{K(0), \ldots, K(N-1)\}$, and can be respectively expressed as:

$$K(0) = \{i|T(0) \leq \rho_i < T(1), K(1) = \{i|T(1) \leq \rho_i < T(2)\}, \ldots, \\ K(N-1) = \{i|T(N-1) \leq \rho_i < T(N)\}. \quad (Eq. 5)$$

In the present example, N weights may be set according to $\{T(0), \ldots, T(N)\}$, and can be expressed as $\{W(0), \ldots, W(N-1)\}$. Then, the N weights are used for adjusting LLR outputted by the signal detection unit 204 as follows:

$$L'_{i,j} = W(n)*L_{i,j}, \text{ wherein } i \in K(n), \quad (Eq. 6)$$

where $L_{i,j}$ is the LLR of a bit j transmitted on a subcarrier i. $L'_{i,j}$ is the LLR of the same bit after performing the adjustment, and is used by the decoding unit 208 for decoding. An absolute value of $L'_{i,j}$ is proportional to a reliability of the subcarrier i according to the definition of the LLR. An average channel estimation error of the subcarriers of the set K(n) is increased with n, if only the difference of the reliability caused by the channel estimation error is considered. Thus, W(n) should be set as a decreasing function of n. That is, the greater a channel estimation error is, the smaller a weight is; in contrast, the smaller the channel estimation error is, the greater the weight is. In the present example, the weights as follows:

$$W(n) = 2^{-n}, 0 \leq n \leq N-2, W(N-1) = 0. \quad (Eq. 7)$$

Then, $L_{i,j}$ generated by the signal detection unit 204 is adjusted to obtain $L'_{i,j}$ according to (Eq. 6). $L'_{i,j}$ is provided to the decoding unit 208 for decoding the demodulated symbols, where $0 \leq i \leq p-1$, $0 \leq j \leq M-1$, P is a number of the subcarriers, and M is a number of bits transmitted in a symbol on a subcarrier.

According to the above example, the weights may be calculated per subcarrier and may be calculated per group after grouping the subcarriers to reduce a complexity, when calculating the weights according to the MSE.

Figure 4:
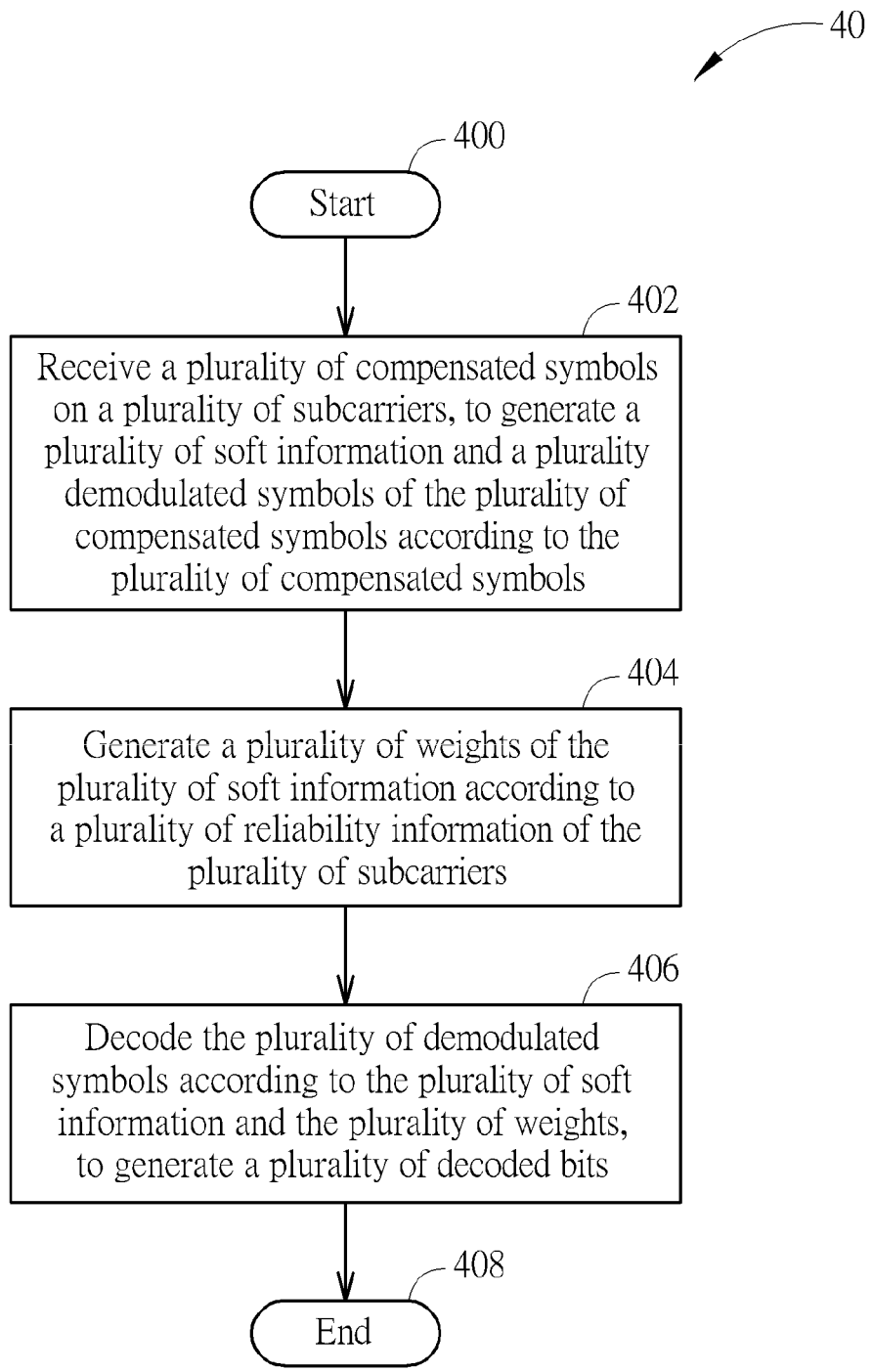
FIG. 4 is a flowchart of a process according to an example of the present invention.

Operations of the receiving device 20 in the above examples can be summarized into a process 40 shown in FIG. 4. The process 40 is utilized in the receiver RX, and includes the following steps:

Step 400: Start.

Step 402: Receive a plurality of compensated symbols on a plurality of subcarriers, to generate a plurality of soft information and a plurality demodulated symbols of the plurality of compensated symbols according to the plurality of compensated symbols.

Step 404: Generate a plurality of weights of the plurality of soft information according to a plurality of reliability information of the plurality of subcarriers.

Step 406: Decode the plurality of demodulated symbols according to the plurality of soft information and the plurality of weights, to generate a plurality of decoded bits.

Step 408: End.

The process 40 is for illustrating the operations of the receiving device 20. Detailed description and variations of the process 40 can be referred to the previous description, and is not narrated herein.

It should be noted that realization of the receiving device (including the channel estimation unit 200, the channel compensation unit 202, the signal detection unit 204, the reliability unit 206 and the decoding unit 208) is not limited to the above description. For example, the channel estimation unit 200, the channel compensation unit 202, the signal detection unit 204, the reliability unit 206 and the decoding unit 208 may be integrated into one or more units according to design considerations or system requirements. In addition, the receiving device 20 may be hardware (e.g., circuit), software, firmware (known as a combination of a hardware device and computer instructions and data that reside as read-only software on the hardware device), an electronic system, combination thereof, etc.

To sum up, the present invention provides a device and a method of handling soft information, for calculating weights of soft information according to reliability information, to adjust proportion of soft information. The present invention can compensate a reduction of decoding performance caused by an inaccuracy of channel estimation, to improve a throughput of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving device, comprising:
   a signal detection circuit, for receiving a plurality of compensated symbols on a plurality of subcarriers, to generate a plurality of soft information and a plurality demodulated symbols of the plurality of compensated symbols according to the plurality of compensated symbols;
   a reliability circuit, coupled to the signal detection circuit, for generating a plurality of weights of the plurality of soft information according to a plurality of reliability information of the plurality of subcarriers; and
   a decoding circuit, coupled to the signal detection circuit and the reliability circuit, for decoding the plurality of compensated demodulated symbols according to the plurality of soft information and the plurality of weights, to generate a plurality of decoded bits.

2. The receiving device of claim 1, further comprising:
   a channel estimation circuit, for generating a plurality of estimated channel responses of the plurality of subcarriers according to a plurality of reference symbols of the plurality of subcarriers; and
   a channel compensation circuit, coupled to the channel estimation circuit and the signal detection circuit, for processing a plurality of received symbols of the plurality of subcarriers according to the plurality of estimated channel responses, to generate the plurality of compensated symbols.

3. The receiving device of claim 1, wherein the plurality of reliability information comprises a plurality of signal energies of the plurality of subcarriers.

4. The receiving device of claim 3, wherein a weight of a first subcarrier of the plurality of subcarriers is smaller than or equal to a weight of a second subcarrier of the plurality of subcarriers if a signal energy of the first subcarrier is smaller than a signal energy of the second subcarrier according to the plurality of signal energies.

5. The receiving device of claim 1, wherein the plurality of reliability information comprises a plurality of signal-to-noise ratios (SNRs) of the plurality of subcarriers.

6. The receiving device of claim 5, wherein a weight of a first subcarrier of the plurality of subcarriers is smaller than or equal to a weight of a second subcarrier of the plurality of subcarriers if an SNR of the first subcarrier is smaller than an SNR of the second subcarrier according to the plurality of SNRs.

7. The receiving device of claim 1, wherein the plurality of reliability information comprises a plurality of location information of the plurality of subcarriers.

8. The receiving device of claim 7, wherein a weight of a first subcarrier of the plurality of subcarriers is smaller than or equal to a weight of a second subcarrier of the plurality of subcarriers if a distance between the first subcarrier and a band edge of the plurality of subcarriers is smaller than a distance between the second subcarrier and the band edge according to the plurality of location information.

9. The receiving device of claim 1, wherein a weight of a first subcarrier of the plurality of subcarriers is smaller than or equal to a weight of a third subcarrier of the plurality of subcarriers, if a distance between the first subcarrier and a second subcarrier with an interference of the plurality of the subcarriers is smaller than a distance between the third subcarrier and the second subcarrier according to the plurality of location information.

10. The receiving device of claim 9, wherein the interference comprises at least one of a color noise and a spur noise.

11. The receiving device of claim 1, wherein the plurality of reliability information comprises a plurality of filter response parameters corresponding to the plurality of subcarriers.

12. The receiving device of claim 11, wherein a weight of a subcarrier corresponding to a first filter response parameter of the plurality of filter response parameters is smaller than or equal to a weight of a subcarrier corresponding to a second filter response parameter of the plurality of filter response parameters if the first filter response parameter is smaller than the second filter response parameter according to the plurality of filter response parameters.

13. The receiving device of claim 1, wherein the plurality of reliability information comprises a plurality of mean square errors (MSEs) of the plurality of estimated channel responses.

14. The receiving device of claim 13, wherein a weight of a subcarrier corresponding to a first channel response of the plurality of channel responses is greater than or equal to a weight of a subcarrier corresponding to a second channel response of the plurality of channel responses if a MSE of the first channel response is smaller than a MSE of the second channel response according to the plurality of the MSEs.

15. The receiving device of claim 1, wherein the plurality of soft information comprises a plurality of loglikelihood ratios (LLRs).

16. The receiving device of claim 1, wherein the plurality of soft information are divided into a plurality sets of soft information corresponding to the plurality of weights, respectively.

* * * * *